United States Patent Office 3,315,987
Patented Apr. 25, 1967

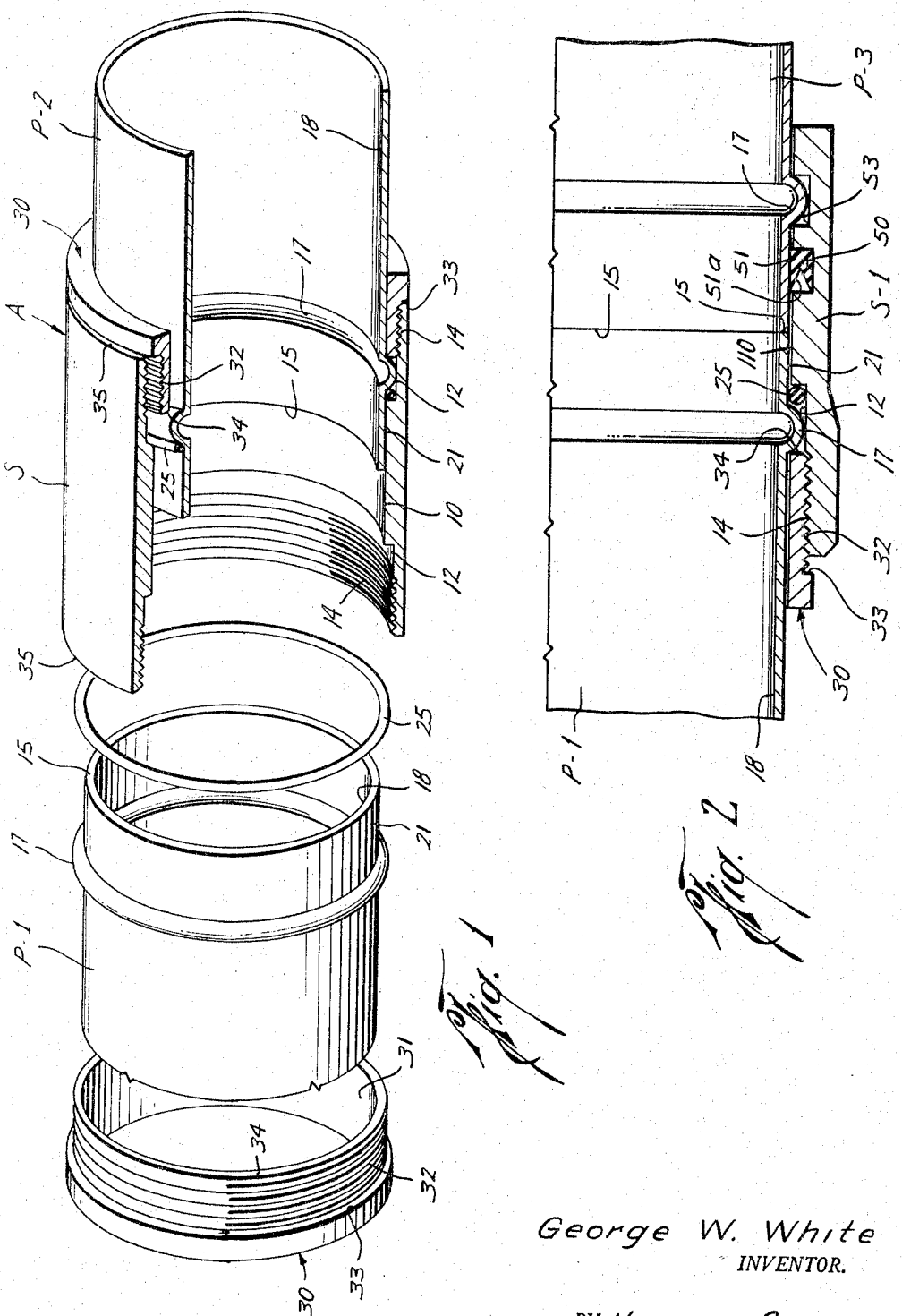

3,315,987
PIPE FITTINGS
George W. White, Houston, Tex., assignor to Mech-Rand Corporation, Houston, Tex.
Filed July 13, 1964, Ser. No. 382,325
2 Claims. (Cl. 285—111)

This invention relates to new and useful improvements in pipe fittings, and particularly pipe couplings suitable for joining thin walled pipe.

An object of the present invention is to provide a new and improved pipe coupling or fitting which is adapted to be readily assembled in seal-tight relationship by hand manipulation, whereby such coupling or fitting may be hand-tightened in the field during installation without requiring tools.

Another object of this invention is to provide a new and improved pipe coupling or fitting wherein the adjacent ends of two sections of pipe are held in contact with each other by a coupling or connecting sleeve, thereby providing support for the pipe which is adequate to prevent bending when the pipe is lifted or dropped.

A further object of this invention is to provide a new and improved pipe coupling or fitting wherein a coupling sleeve or fitting is adapted to receive one end of a pipe or tube having an annular rolled external shoulder formed therewith for confining an O-ring seal between such shoulder and an internal shoulder in the coupling sleeve or fitting, the pipe or tube having no internal restrictions throughout its length, whereby a "pig" or other internal unit may be moved through the pipe when assembled.

Still another object of this invention is to provide a new and improved pipe coupling or fitting which can be made up in the field from plain-ended pipe or tube which is formed with an annular bead at the time of installation by a single rolling operation so that only the tool for such rolling operation is used for field installation; if preferred, the annular bead may be formed at the factory so that no tools are needed at the place of installation.

A particular object of this invention is to provide a new and improved pipe coupling or fitting having a coupling sleeve adapted to be secured to an end of a section of pipe or tubing by a hand-tightened annular retaining nut slidably disposed on the pipe or tubing and adapted to be threaded to the coupling sleeve.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view of the preferred embodiment of this invention, with the left hand portion thereof in an exploded view, and with the right hand section thereof having a segment removed for illustration purposes; and FIG. 2 is a quarter-section view of a modified fitting or coupling of this invention.

In the drawings, the letter A designates generally the pipe fitting or coupling of this invention. As used herein the term "fitting" is generic to all types of couplings and other fittings, but as illustrated in the drawings, the fitting A is a coupling construction for joining two pipe sections P-1 and P-2. The pipe sections P-1 and P-2 are coupled together with a coupling sleeve or connecting sleeve S in a manner to be hereinafter described more in detail. The sleeve S may actually have different configurations such as a T, elbow or other shape, and in some instances only one of the pipe sections P-1 and P-2 may be connected to the sleeve or other fitting S. With this invention, the connection of the pipe section or sections to the sleeve or fitting S may be readily accomplished in the field at the point of installation by hand manipulation and without requiring any tools. Thus, as will be explained hereinafter, the fitting or coupling A of this invention is adapted to be connected in a seal-tight condition at the place of installation readily and accurately by hand-tightening.

Considering the invention more in detail, the sleeve S has an intermediate or central bore 10. It will be understood that the sleeve S as shown in FIG. 1 is partially cut away, but that it is in fact made as a complete sleeve or cylinder so that the inner cylinder surface 10 is cylindrical.

On each side of the intermediate cylindrical inner surface 10, the internal surface of the sleeve S is provided with an enlarged diameter cylindrical section or surface, a portion of which is smooth as indicated at 12 and another portion of which is threaded as indicated at 14. It will be appreciated that in some instances, where only one pipe section is connected to a sleeve or other type of fitting S, the sleeve or fitting will have only the smooth surface portion 12 and the threads 14 on one side of the inner diameter surface 10.

The pipe section P-1 is a length of pipe, a portion of which is illustrated in FIG. 1, it being understood that the length of such pipe may vary in actual field installation. Near the inward end 15 of such pipe section P-1, an annular bead 17 is rolled so that there is no internal projection into the bore 18 of the pipe section P-1. The external diameter of the annular bead 17 is substantially the same as, and preferably slightly smaller than, the internal diameter of the smooth cylindrical surface 12 of the coupling sleeve S. Thus, when the bead 17 is positioned within the sleeve S, the bead 17 is in engagement with the smooth surface 12 to avoid any outward distortion thereof in the coupled position such as shown for the pipe section P-2 in FIG. 1. The pipe section P-1 has an external diameter on the surface 21 inwardly of the bead 17 which is substantially the same as the internal diameter of the cylindrical surface 10. Also, as will be more evident hereinafter, the longitudinal length from the bead 17 to the end 15 of the annular surface 21 is such that the ends 15 of each of the pipe sections P-1 and P-2 contact each other when the sections are coupled together in the sleeve S.

For providing a seal, each of the pipe sections has an O-ring 25 formed of rubber, neoprene or any other similar sealing resilient material. The internal diameter of the ring 25 is approximately equal to the external diameter of the surface 21 so that it sealingly engages the surface 21 and also sealingly engages the internal smooth surface 12 of the coupling sleeve S when the pipe section P-1 is in the assembled or coupled position as shown for the pipe section P-2 in FIG. 1.

To lock each of the pipe sections to the coupling S by hand-tightening a locking sleeve 30 is provided for each of the pipe sections P-1 and P-2. Each locking sleeve 30 has an internal diameter in its bore 31 which is substantially equal to the external diameter of the pipe P-1 or P-2. The external surface of a portion of each locking sleeve or nut 30 has threads 32 for threaded engagement with the threads 14 in the ends of the sleeve S as illustrated in FIG. 1. A shoulder 33 is provided on each locking sleeve 30, for engagement with the outer end 35 of the sleeve S in the event the locking sleeve or nut 30 is moved inwardly to that extent. The inward annular end or edge 34 of each locking sleeve 30 is adapted to engage the outward portion of one of the annular beads 17 to move the inward end 15 of the pipe section therewith into contact with the inward end 15 of the other pipe section within the sleeve S.

As noted above, the pipe section P-2 is preferably the same in all respects as the pipe section P-1 and the various parts which are used therewith are also the same. Therefore, the parts of the apparatus of this invention which are used with the pipe section P-2 have the same letter and numeral designations as referred to above in connection with the pipe section P-1.

In the use of the fitting or coupling A of this invention, the pipe sections may be plain-ended when delivered to the field, and in such case, the annular beads 17 may be suitably rolled with a rolling tool for metal work. Normally, the pipe used in the pipe sections P-1 and P-2 are aluminum or other similar metal which has a relatively thin wall, although the invention is not limited to thin wall pipe. However, the thin wall pipe may be more readily formed in the field to provide the annular bead 17 at each end of each of the pipe sections to be coupled. In some instances, the bead 17 at each end of each pipe section may be formed at the factory or at a point remote from the place of installation and in that case, the connection of the coupling A may be made directly in the field without the use of any tools because the lock nuts or sleeves 30 may be hand-tightened to an amount which is sufficient to provide the strength and the sealing connection for the flow of liquids through the pipe without leakage. Also, since the ends 15 of the adjacent pipe sections engage each other, the end force of any bending action is distributed to the adjacent section of pipe and thereby bending is inhibited. It should also be noted that since the bead 17 engages the surface 12, the tightening of the nut 30 on each pipe section does not tend to enlarge or expand the bead 17 so that a tight seal with the ring 25 is accomplished without distortion of the annular bead 17.

In FIG. 2, a modified form of the invention is illustrated, wherein the coupling or sleeve S-1 is modified as compared to the sleeve S of FIG. 1. The pipe section P-1 with its related parts are identical to the pipe section P-1 of FIG. 1 and therefore the same parts are identified with the same letters and numerals.

The coupling sleeve or connector S-1 also preferably has an intermediate portion 110. A seal groove 50 is provided with the connector S-1 for receiving a seal ring formed of rubber, neoprene or other packing material. Such seal ring is designated with the numeral 51 and it has a substantially V-shaped notch 51a extending annularly on one side thereof for obtaining an effective seal even with air or gas flowing in the pipe from left to right as viewed in FIG. 2. The pipe section P-3 is identical with the pipe sections P-1 and P-2, except that it has its annular bead 17 rolled therein after positioning the pipe section P-3 within the sleeve S-1 so that the bead 17 is actually formed in an annular groove or recess 53 of the sleeve S-1 as a permanent connection. Such bead 17 of the pipe section P-3 is provided with an annular external surface having a diameter substantially equal to the internal diameter of the annular groove 53 so as to be prevented from outward distortion once the bead 17 has been formed. It will be appreciated that the pipe section P-3 cannot be removed from the connector S-1 in the field since the bead 17 locks the section P-3 to the connector S-1. Therefore, the locking nut or sleeve 30 used with the pipe section P-1 is not used with the pipe section P-3.

In the use of the form of the invention shown in FIG. 2, the pipe section P-3 is formed at the factory or shop with the connector S-1 secured thereto in a position shown in FIG. 2. Then, in the field, at the point of installation, the pipe section P-1 is connected to the coupling or connector S-1 in the same manner as heretofore described in connection with FIG. 1. It is to be noted that the ends of the pipe sections P-1 and P-3 are engaged and contact each other for the strength endwise for preventing any buckling of the pipe when lifted or otherwise moved in laying the pipe or in other uses thereof.

Although the invention herein has been described in connection with a sleeve S and a coupling S-1, both of which are basically cylindrical, it will be understood that other shapes for the coupling members may be employed, as pointed out heretofore so that elbows, T's and other types of fittings may be readily connected to one or more sections of pipe. With the present invention, since there are no internal restrictions after the coupling or fitting A is connected, the cleaning "pigs" or plugs may be forced or moved through the pipe for cleaning or other purposes.

It should also be noted that after the connection of the pipe section P-1 or P-2 or both, has been made with the sleeve or connector S, the pipe sections can be independently rotated within the sleeve or fitting S without breaking the seal provided at the seal ring 25. Such feature permits the installation of misaligned pipe. Also, since plain ended pipe may be used and the bead 17 formed at the place of installation, the pipe sections may be cut to lengths desired for fitting in particular locations.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A pipe coupling comprising:
   (a) a pipe section having an annular external bead formed thereon near one end thereof;
   (b) a tubular member having an end abutting against the said one end of said pipe section;
   (c) said tubular member having an annular external bead formed thereon near the abutting end thereof;
   (d) a coupling sleeve having a bore extending therethrough and a counterbore; the bore and counterbore forming a shoulder therebetween; said coupling sleeve encircling the abutting ends and annular beads of said pipe section and said tubular member;
   (e) the counterbore of said coupling sleeve positioned over the annular external bead on said tubular member;
   (f) said coupling sleeve having an enlarged internal annular groove fitting over the annular external bead on said pipe section and including means therewith preventing relative axial movement between said sleeve and said pipe section;
   (g) a first seal member positioned between said sleeve and said pipe section providing fluid-proof connection interiorly of said coupling sleeve between the abutted ends and the annular external bead on said pipe section;
   (h) a second seal member disposed in said counterbore between the annular external bead on the tubular member and the shoulder of the counterbore providing fluid-proof connection relative to said coupling sleeve and said tubular member; and
   (i) a locking ring having means thereon coacting with means on said sleeve for securing said second seal member in fluid-proof sealing position and retaining said annular external bead of said tubular member in sealing engagement with said second seal member in said counterbore and maintaining said ends of said pipe section and said tubular member in abutting relationship; said locking ring being movable relative to said tubular member.

2. The structure set forth in claim 1, wherein said second seal member has a cross-section approximating a V-shape to form a depressible flap for sealing, with said depressible flap opening towards the abutted ends of the pipe section and the tubular member.

References Cited by the Examiner

UNITED STATES PATENTS

| | | | |
|---|---|---|---|
| 168,970 | 10/1875 | Caswell | 285—280 X |
| 607,180 | 7/1898 | Landis | 285—353 |
| 2,477,677 | 8/1949 | Woodling | 285—281 |
| 2,543,088 | 2/1951 | Woodling | 285—382.5 X |
| 2,599,389 | 6/1952 | Hume | 285—353 X |
| 2,774,617 | 12/1956 | Lanninger | 285—111 X |
| 2,781,207 | 2/1957 | Detweiler et al. | 285—353 X |
| 3,207,534 | 9/1965 | Kimbrell et al. | 285—55 |

FOREIGN PATENTS

| | | |
|---|---|---|
| 167,884 | 6/1956 | Australia. |
| 453,217 | 2/1936 | Great Britain. |
| 493,675 | 10/1938 | Great Britain. |

CARL W. TOMLIN, *Primary Examiner.*

THOMAS F. CALLAGHAN, *Examiner.*

D. W. AROLA, *Assistant Examiner.*